United States Patent [19]

Ono et al.

[11] Patent Number: 5,452,095
[45] Date of Patent: Sep. 19, 1995

[54] RECORDING APPARATUS AND METHOD HAVING A RECORDING MODE WHICH REPEATEDLY RECORDS RECORDING DATA FOR ONE LINE A PLURALITY OF TIMES

[76] Inventors: Takeshi Ono; Masakatsu Yamada, both of c/o Canon Kabushiki Kaisha 30-2, 3-chome, Shimomaruko, Ohta-ku, Tokyo, Japan

[21] Appl. No.: 223,813

[22] Filed: Apr. 6, 1994

Related U.S. Application Data

[63] Continuation of Ser. No. 870,352, Apr. 17, 1992.

[30] Foreign Application Priority Data

Apr. 22, 1991 [JP] Japan ................................. 3-090579
Jun. 4, 1991 [JP] Japan ................................. 3-131567

[51] Int. Cl.6 .......................... H04N 1/23; B41J 2/05; B41J 2/36
[52] U.S. Cl. ....................................... 358/296; 347/3; 347/11; 347/57; 347/171
[58] Field of Search ............. 358/296, 502, 503; 346/76 PH; 400/120, 126; 347/3, 11, 56, 57

[56] References Cited

U.S. PATENT DOCUMENTS

| | | | |
|---|---|---|---|
| 4,216,481 | 8/1980 | Hakoyama | 346/76 PH |
| 4,723,129 | 2/1988 | Endo et al. | 346/1.1 |
| 4,740,796 | 4/1988 | Endo et al. | 346/1.1 |
| 4,748,455 | 5/1988 | Mori | 346/76 PH |
| 4,760,462 | 7/1988 | Ogawa | 346/76 PH |
| 4,875,056 | 10/1989 | Ono | 346/76 PH |

FOREIGN PATENT DOCUMENTS 62-253457 11/1962 Japan .

*Primary Examiner*—Scott A. Rogers
*Attorney, Agent, or Firm*—Fitzpatrick, Cella, Harper & Scinto

[57] ABSTRACT

Disclosed is a recording apparatus using a recording head for recording in line units and having a recording mode for recording on a recording medium by repeatedly recording recording data for one line a plurality of times. A counting means counts a time interval between the termination of recording for one line and the start of recording for a next one line. A controlling means controls energy to be applied to the recording head at recording for the next one line in accordance with a time interval counted by the counting means.

32 Claims, 9 Drawing Sheets

RECORDING APPARATUS AND METHOD HAVING A RECORDING MODE WHICH REPEATEDLY RECORDS RECORDING DATA FOR ONE LINE A PLURALITY OF TIMES

This application is a continuation of application Ser. No. 07/870,352, filed Apr. 17, 1992.

BACKGROUND OF THE INVENTION

1. Field of the Invention

The present invention relates to a recording apparatus and recording method, and particularly, as in the case of facsimile equipment, to a recording apparatus and recording method in which a recording cycle is different line by line, recording is made intermittently, and a recording mode with a plurality of line densities is involved.

2. Related Background Art

In a conventional thermal recording apparatus involving a plurality of line densities of feed for recording, the same data is repeatedly recorded with the same energy applied to a thermal head for recording at a low line density. In other words, many models of current facsimile equipment have line densities of feed of 3.85 lines/mm for standard mode, 7.7 lines/mm for fine mode, and 15.4 lines/mm for super fine mode. In such a case, the length of a heating element of the thermal head is designed to be 1/15.4 mm in the direction of feed; in the super fine mode, one line is recorded in one recording operation; in the fine mode, the same data is continuously recorded twice for recording one line at a line density corresponding to the fine mode; and in the standard mode, the same data is recorded continuously four times for recording one line at a line density corresponding to the standard mode. In addition, recording paper is conveyed by 1/15.4 mm in the direction of feed at each of these recordings. Here, if lines are different, corresponding line data are different from each other.

However, in the example of prior art described above, in the standard mode and fine mode, the same data is recorded a plurality of times with the same energy applied to the thermal head at each line recording; consequently, as the count of recording increases, applied energy becomes excessive due to heat accumulation in the thermal head, causing problems of a dragged recorded image and a defaced dot. Also, if energy applied to the thermal head is reduced to prevent such dragging and defacing, there are problems of insufficient density of a recording starting line and scratches. In this connection, it is conceivable to reduce energy applied to the thermal head by a predetermined amount at each line recording when the same line data is recorded a plurality of times for recording one line at a line density corresponding to each mode. In this case, however, the state of the dragging and defacing of an image varies depending on a recording time interval from a preceding line at each line recording, and consequently the effect of reducing energy line by line is not sufficiently attained. On the other hand, it is also conceivable to detect the temperature of the thermal head and control the applied energy on the basis of the detected temperature. However, it is difficult to make a complete correspondence between an actual thermal head temperature and a thermistor temperature, and therefore the aforementioned problems cannot be solved by this method alone.

In conventional thermal recording using a full-line type thermal head, heating elements of the thermal head are divided into a plurality of blocks and are energized for recording each line, thereby dispersing electric power at recording for implementing a compact power supply. In recording with these blocks, each block is energized only once for recording (FIG. 5) or the timing of moving a recording medium such as recording paper and, the timing of energizing each block, for reducing a maximum attainable temperature of the thermal head and, moreover, for thermal ink transfer, are divided into a plurality of times for recording.

However, as in the example of the aforementioned prior art, the recording method of energizing each block a plurality of times for recording, has less energy applied to the thermal head as compared with the recording method of energizing each block only once. This has led to the problem that the time required for recording each line becomes longer in order to record one line with sufficient density secured. Also, if a time interval for each line changes, uneven image density may occur.

SUMMARY OF THE INVENTION

The present invention has been made in consideration of the problems of the related arts described above and with a new approach which has not been thought of.

An object of the present invention is to provide a recording apparatus and recording method capable of recording at even density irrespective of a recording time interval for each line.

Another object of the present invention is to provide a recording apparatus using a recording head for recording in line units and having a recording mode for recording on a recording medium by repeatedly recording recording data for one line a plurality of times, having:

counting means for counting a time inverval between the termination of recording for one line and the start of recording for a next one line; and controlling means for controlling energy to be applied to the recording head at the recording for next one line in accordance with the time interval counted by the counting means.

A further object of the present invention is to provide a recording method using a recording head for recording in line units and recording on a recording medium by repeatedly recording recording data for one line a plurality of times, having:

a step of counting a time interval between the termination of recording for one line and the start of recording for a next one line; and a step of recording energy to be applied to the recording head in accordance with the counted time interval each time the plurality of recording operations are conducted at the recording for a next one line.

Still another object of the present invention is to provide a recording method using a recording head for recording in line units and recording on a recording medium by repeatedly recording recording data for one line a plurality of times, having:

a step of counting a time interval between the termination of recording for one line and the start of recording for a next one line; and a step of changing the number of the plurality of recording operations to be conducted at the recording for the next one line in accordance with the counted time interval.

DETAILED DESCRIPTION OF THE PREFERRED EMBODIMENTS

Preferred embodiments of the present invention will hereinafter be described in detail with reference to the attached drawings.

Embodiments 1 and 2 described below, describe a case where a recording apparatus according to the present invention is applied to facsimile equipment.

Embodiment 1

Figure 1:
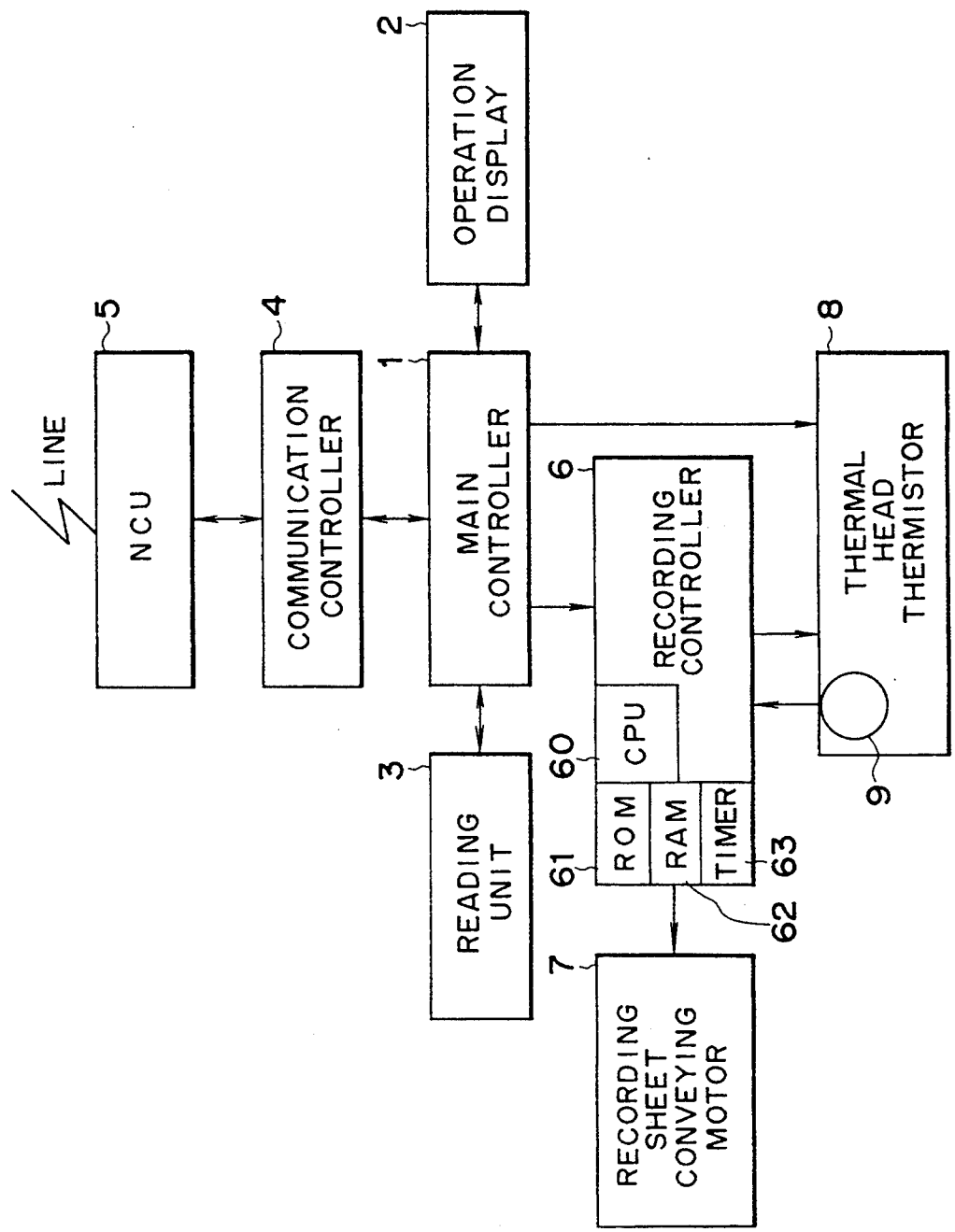
FIG. 1 is a block diagram showing a schematic construction of facsimile equipment to which a recording apparatus according to the present invention is applied.

Description of facsimile equipment (FIG. 1)

FIG. 1 is a block diagram showing a schematic construction incorporating facsimile equipment of the present embodiment.

In FIG. 1, reference numeral 1 designates a main controller which controls the entire equipment, and reference numeral 2 designates an operation display with an operation panel having various function keys, and a ten-key pad for telephone number entry and a liquid crystal display for displaying various messages for an operator and the like. Reference numeral 3 designates a reading unit which photoelectrically reads a document image, converts the read document image to a digital signal, and outputs image data to the main controller 1. The reference numeral 4 designates a communication controller which is connected to a communication line through a network control unit (NCU) and exercises various controls for facsimile communication. Reference numeral 6 designates a recording controller including a one-chip microcomputer having a ROM 61 for storing, for example, a CPU 60 control program and pulse width data to be described later, a RAM 62 to be used as work area for the CPU 60, a timer 63 for counting time under an instruction from the CPU 60, etc.; the recording controller 6 controls the energizing of a motor 7 for conveying recording sheet which is a recording medium and a thermal head 8 which is a recording device. Reference numeral 9 designates a thermistor which is a temperature sensor for detecting a temperature of the thermal head 8 and outputting the detected temperature information.

In such a construction, during the copying operation the recording sheet conveying motor is driven for starting to move a recording sheet, and the thermal head 8 is heated and driven for recording on the basis of image data which has been read by the reading unit 3. In the case of receiving facsimile image, the facsimile image is received from the communication line through the NCU 5, and image data which has been demodulated by the communication controller 4 is converted by the main controller 1 into a form capable of being recorded by the thermal head 8. The main controller 1 sends a print command to the recording controller 6 each time the main controller 1 transfers one line of the converted image data to the thermal head 8. Upon receiving the print command, the recording controller 6 starts to move the recording sheet and, at the same time, heats and drives the thermal head 8 according to a temperature of the thermal head 8 for recording for one line.

At this recording for one line, in order to reduce the number of simultaneously energized heating elements for implementing a compact equipment power supply, heating elements for one line of the thermal head 8 are usually divided into approximately two to eight blocks, and each block is sequentially energized for recording one-line data. The time of energizing each block (applied time) is called the energizing pulse width (applied pulse width).

In such line-by-line recording, the time required for data of one line to become ready for recording varies depending on line conditions, the capability of the modem (modulator-demodulator), the complexity of the received facsimile image data (the number of times of inversion of black and white dots), the encoding form and line density of feed, etc., causing intermittent recording with random recording cycle. The timer 63 of the recording controller 6 counts this recording interval extending to the time the next line of data becomes ready.

In the case of a low line density of feed, that is, in other than super fine mode, after recording data for one line has been transferred from the main controller 1 to the thermal head 8, the main controller 1 outputs the line density of feed simultaneously with a print command to the recording controller 6. In response to the line density of feed and the print command, the recording controller 6 records the same recording data four times in standard mode for recording for one line while conveying recording sheet by 1/15.4 (mm) at each recording operation, and records the same recording data two times in fine mode for recording for one line while conveying recording sheet by 1/15.4 (mm) at each recording operation.

Figure 2:
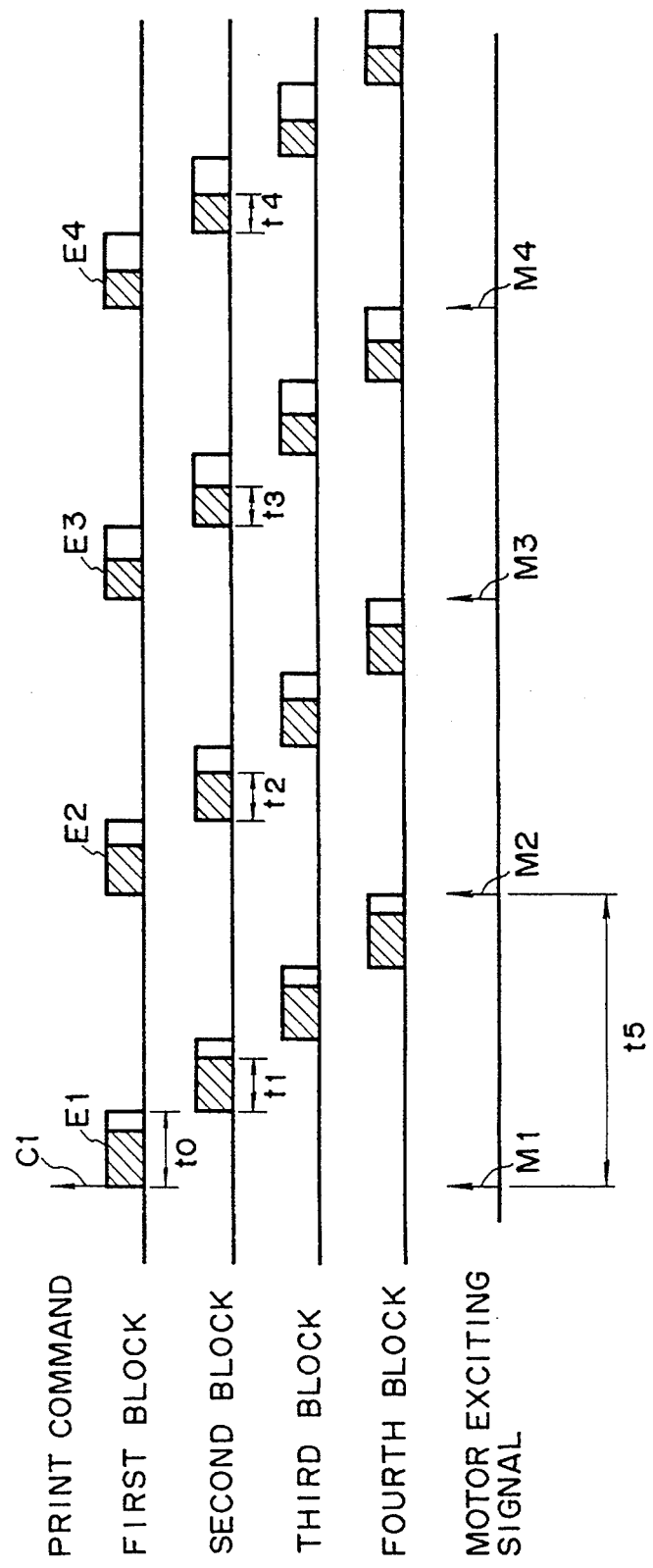
FIG. 2 is a timing chart showing recording timing in standard mode.

Description of recording timing in standard mode (FIG. 2)

FIG. 2 is a chart showing the timing of a recording operation which the recording controller 6 of the present embodiment performs in standard mode.

When recording data for one line is transferred from the main controller 1 to the thermal head 8, and the recording controller 6 receives a print command, the recording controller 6 outputs a motor exciting signal to the recording sheet conveying motor 7, thereby starting to convey the recording sheet for recording one line. Described herein is the case where heating elements of the thermal head 8 are divided into four blocks, and recording is made by the thermal head 8 for super fine mode with each heating element thereof being 1/15.4 mm long in the direction of feed.

In this recording, one line in super fine mode is recorded in about 2.4 ms (time t5) by moving writing where recording starts simultaneously with recording sheet being conveyed. Hence, a time span of about 0.6 ms is prepared for pulse width $t_0$ which specifies an energizing time for each block of the thermal head 8. The energizing time is determined within 0.6 ms according to a temperature of the thermal head 8 detected by the thermistor 9 and control of the present embodiment. For example, as shown in FIG. 2, in standard mode, energization is made as long as pulse width $t_1$ for first recording, as long as pulse width $t_2$ for second recording, as long as pulse width $t_3$ for third recording, and as long as pulse width $t_4$ for fourth recording, respectively. Here, $t_0 > t_1 > t_2 > t_3 > t_4$ is assumed.

Figure 3:
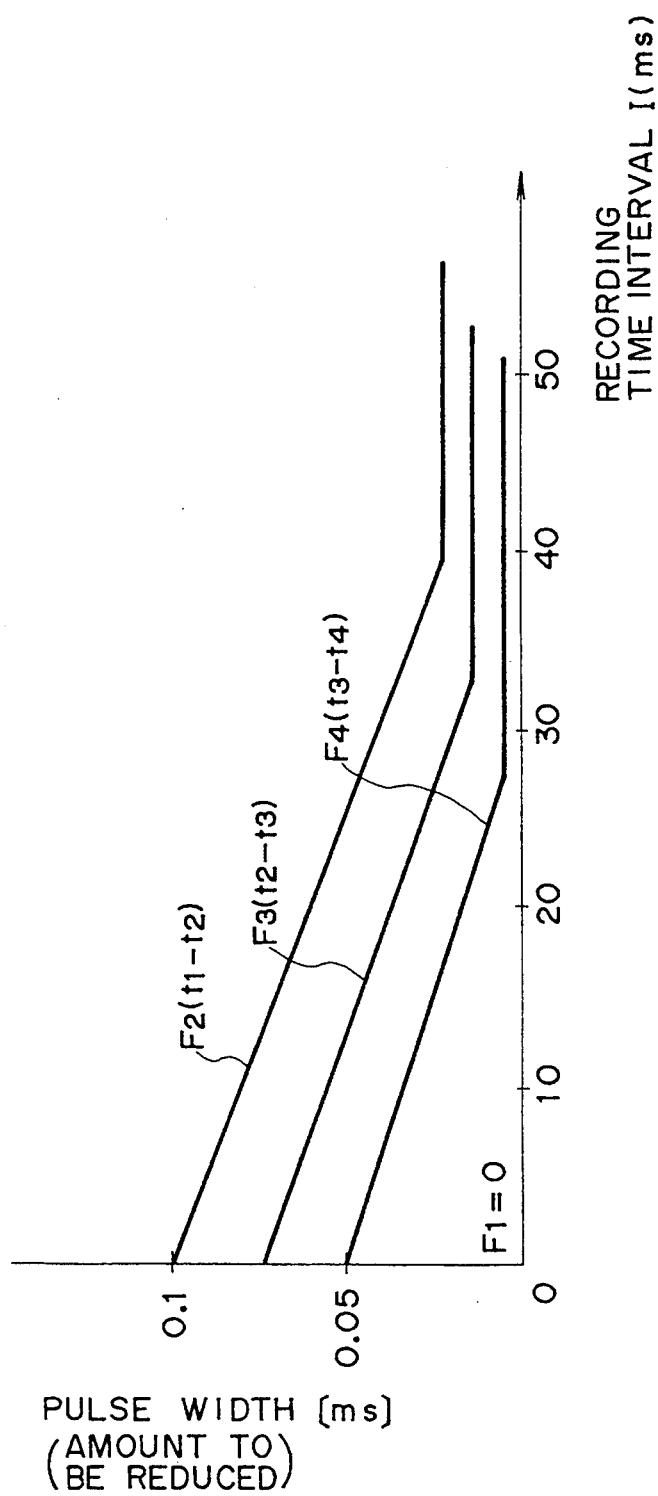
FIG. 3 is a graph showing the relation between an amount to be reduced with respect to a pulse width for a thermal head and a recording time interval.

FIG. 3 is a graph showing the relation between an amount to be reduced as above with respect to a pulse width and a time interval from preceding line recording.

Data for determining a pulse width is stored in the ROM 61 of the recording controller 6; a value of $F_2 = (t_1 - t_2)$ is subtracted from the pulse width of first recording for the second recording, a value of $F_3 = (t_2 - t_3)$ is subtracted from the pulse width of second recording for the third recording, and a value of $F_4 = (t_3 - t_4)$ is subtracted from the pulse width of third recording for the fourth recording, thereby determining an energizing pulse width for each recording. Here, with $F_1 = 0$ assumed, when a recording time interval is "0" ms, $F_2$ is 0.1 ms and $F_4$ is 0.05 ms; when a recording time interval becomes 40 ms or more, values of $F_2$, $F_3$, and $F_4$ become constant.

Figure 4:
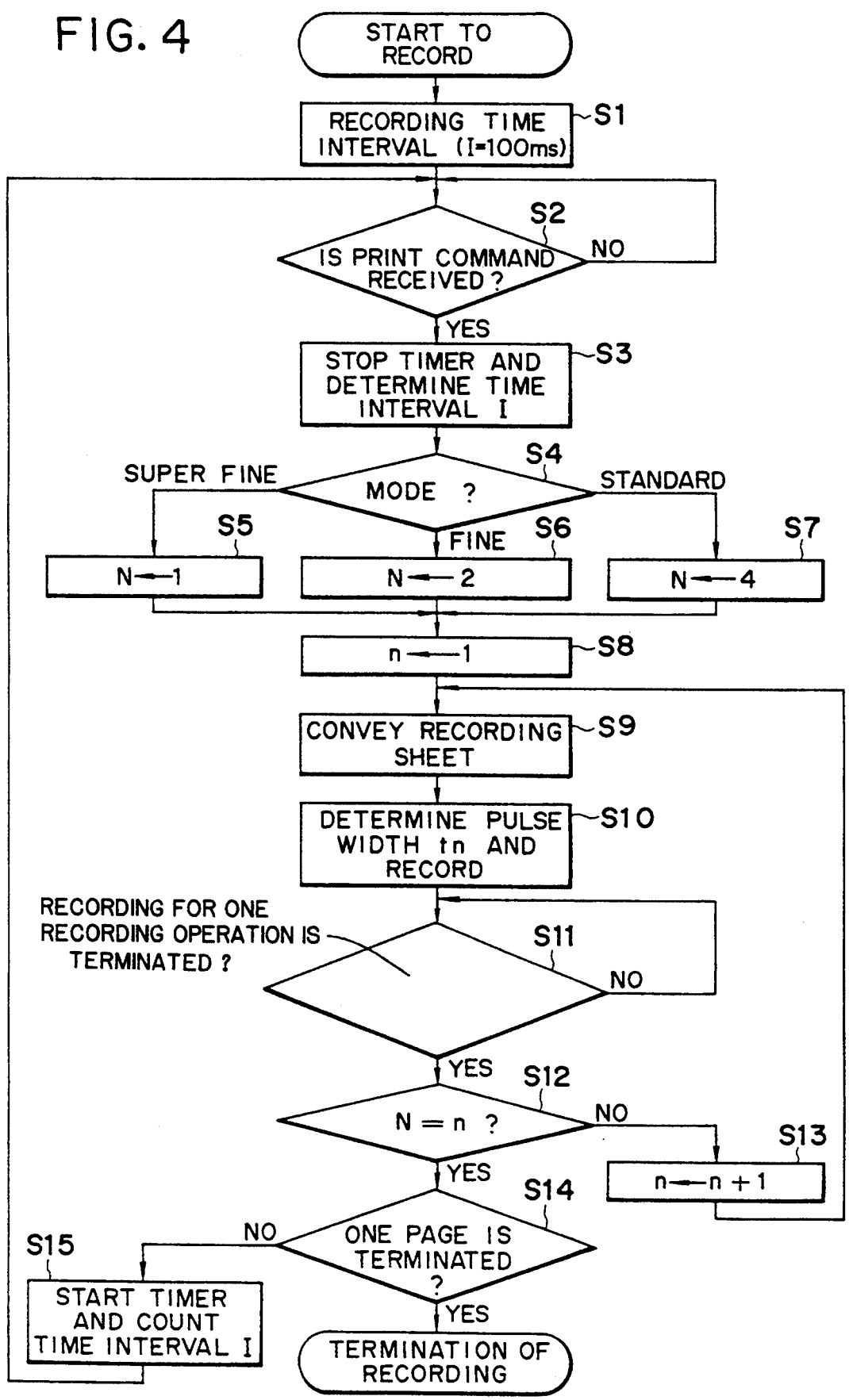
FIG. 4 is a flowchart showing a received image recording operation in facsimile equipment of embodiment 1.

FIG. 4 is a flowchart showing a recording operation to be executed by CPU 60 of the recording controller 6 in facsimile equipment of the present embodiment.

First, at step S1, I=100 ms is set as an initial time interval value for each line at the beginning of a page, thereby minimizing a reduction of a pulse width for recording the same line by continuously repeated recording operation. When a print command from the main controller 1 is input at step S2, proceeding to step S3 stops the operation of the timer which counts a time interval for each line and determines a time interval I. Consequently, 100 ms (I) specified at step S1 is selected at the beginning of a page, and after the beginning of a page, a value (time interval) of the timer 63 is set, whereby the timer has started counting at step S15.

Next, step S4 interprets a mode of line density of feed, i.e. facsimile receiving mode. If the facsimile receiving mode is super fine mode, step S5 proceeds, "1" is set for N; and if the facsimile receiving mode is fine mode, step S6 proceeds, and "2" is set for N; if the facsimile receiving mode is standard mode, step S7 proceeds, and "4" is set for N. The values of N indicate the number of recording times when the same recording data is repeatedly recorded for a line.

At step S8, "1" is set for pointer n, causing a first pulse width to be selected. A recording area for the pointer n and aforementioned N is provided in the RAM 62. Next, step S9 proceeds, wherein the recording sheet conveying motor 7, is driven and at the same time, at step S10, the thermal head 8 is energized for recording as long as pulse width $t_n$ which is determined in accordance with a current temperature of the thermal head 8 and time interval I from a preceding line. In other words, a pulse width for energizing the thermal head 8 becomes $(t_1)$ for a first recording where the same line is recorded by repeated recording operation, the pulse width for energizing the thermal head 8 becomes $(t_1 - F_2)$ for a second recording, the pulse width for a energizing the thermal head 8 becomes $(t_2 - F_3)$ for third recording, and the pulse width for energizing the thermal head 8 becomes $(t_3 - F_4)$ for a fourth recording, thereby obtaining an energizing pulse width according to a recording time interval for recording.

When four blocks of the thermal head 8 have been energized for recording at step S11, step S12 proceeds wherein a check is made as to whether recording for one line data has been terminated according to current line density of feed. In other words, step S12 checks whether recording has been made one time in super fine mode, two times in fine mode, or four times in standard mode; if recording for one is not terminated, step S13 proceeds, n is incremented by 1, and the process returns to step S9 to execute the aforementioned process.

On the other hand, if recording for one line is terminated at step S12, step S14 proceeds to check whether recording for one page is terminated. When recording for one page is terminated, cutting and ejecting recording sheet in page units and the like are conducted to terminate a recording process for one page.

However, if a recording operation for one page is not terminated, step S15 proceeds to start the timer 63 for counting a recording time interval I to next line, and a returns to step S2 to repeat aforementioned process. Hence, the timer 63 is read for a counted value I (recording time interval) thereof at the next step S3, and a pulse width for energizing the thermal head 8 is determined at step S10.

According to the present embodiment, the recording controller 6 controls the energization of the thermal head 8. The present invention, however, is not limited to the practice that the recording controller 6 controls the energization of the thermal head 8, but allows the main controller 1 to directly control the energization of the thermal head 8.

As shown in FIG. 3, according to the present embodiment, the amount to be reduced with respect to an energizing pulse width for the thermal head 8 is a function of recording time interval I. In addition, a feature may be added that the amount to be reduced with respect to an energizing pulse width is increased as the temperature of the thermal head 8 detected by the thermistor 9 increases. In particular, if the dragging of an image or the like in standard mode is a problem, an amount to be reduced with respect to a pulse width may be controlled for each recording operation according to the recording system concerned; for example, a pulse width for a fourth recording may be reduced more than for a second recording and a third recording.

Also, according to the present embodiment, energy applied to the thermal head 8 at recording is controlled by controlling an energizing pulse width. Needless to say, however, the applied energy may be controlled by controlling an applied voltage, energizing current, the number of energizing pulses or the like.

In image processing such as smoothing, if recording data (line data) to be continuously recorded are not exactly the same data, but can be substantially taken as the same data, applied energy control for a thermal head according to the present embodiment is effective. Also, the applied energy control is effective for printers and the like in which the same data is continuously recorded irrespective of line density of feed.

The present invention may be applied to a system comprising a plurality of apparatuses or equipment comprising a single apparatus. The present invention can be embodied only by supplying systems or equipment with a program for executing process specified therein without involving a major change in equipment mechanisms.

As described above, the present invention makes it possible to reduce the occurrence of problems such as the dragging and defacing of a recorded image irrespective of the length of a recording time interval for each line and hence, conduct recording at even density and high recording quality.

Embodiment 2

Figure 5:
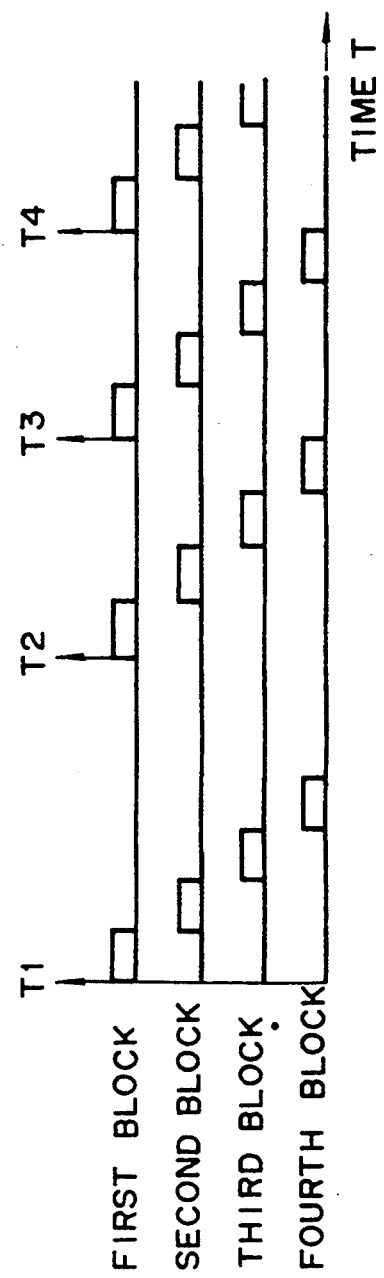
FIG. 5 is a timing chart showing recording timing in a thermal recording unit of conventional facsimile equipment.

FIG. 5 is a chart showing energizing timing for a thermal head in conventional facsimile equipment.

Usually, in a full multi-thermal head, in order to reduce power consumption at recording for implementing a compact equipment power supply unit, one line is divided into a plurality of blocks, and power is sequentially applied to individual blocks for recording for one line. FIG. 5 is an example of dividing heating elements of a thermal head into four blocks; a print command to be input at the timing of T1, T2, . . . causes a voltage to be sequentially applied (for energization) to the four blocks of the thermal head starting from a first block for conducting a recording operation for each block, thereby making recording for one line. A block diagram showing a schematic construction of facsimile equipment of the present embodiment 2 is similar to that of embodiment 1, and therefore, description thereof is omitted.

Figure 6:
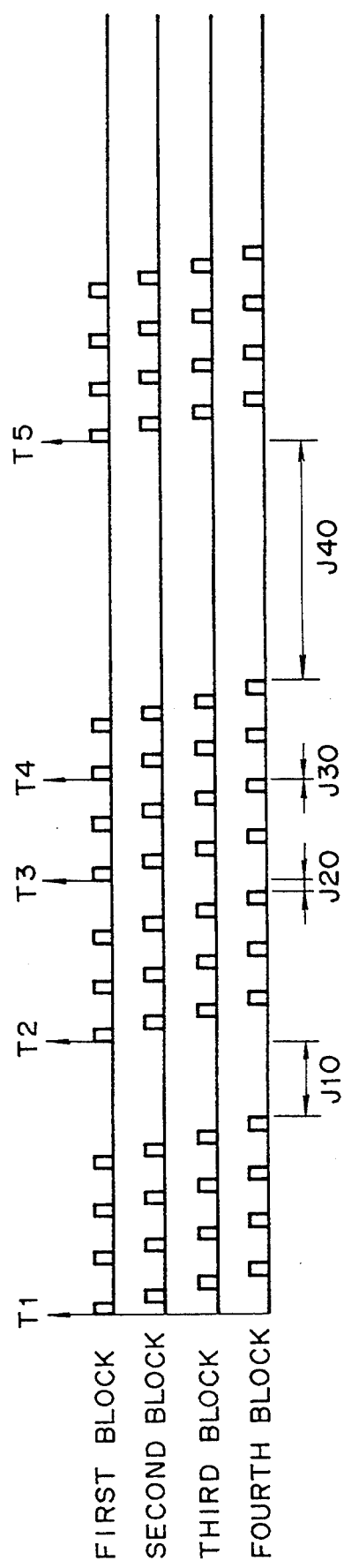
FIG. 6 is a timing chart showing recording timing in a recording unit of facsimile equipment of embodiment 2.

FIG. 6 is a timing chart showing recording timing in facsimile equipment of the present embodiment. Each block is energized four times for recording in the present embodiment while each block is energized once for recording in an example of recording shown in FIG. 5.

A feature of recording of the present embodiment is that in moving writing where recording is made while a recording sheet is moving, each block is alternately energized a plurality of times for recording during the recording sheet's moving in comparison with recording by single energization. Consequently, it becomes possible to prevent white streaks in an image which may otherwise occur in the conveying direction of recording sheet (direction of feed). Also, since a maximum attainable temperature of heating elements of the thermal head 8 drops, the service life of the thermal head 8 can be prolonged, and unnecessary ink fusion or sticking can be prevented at thermal ink transfer. In said divided recording, however, each block of the thermal head 8 is repeatedly energized and deenergized, and therefore, the voltage applied time for each block is longer for obtaining the same density as compared with recording by a single energization. Hence, the time required for recording each line increases slightly.

The present inventor has found that in order to effectively conduct such divided recording in facsimile equipment whose minimum transmission time is specified in standards, it is effective to change the number of times of repeated recording for each block in accordance with a recording time interval for each line.

Figure 7:
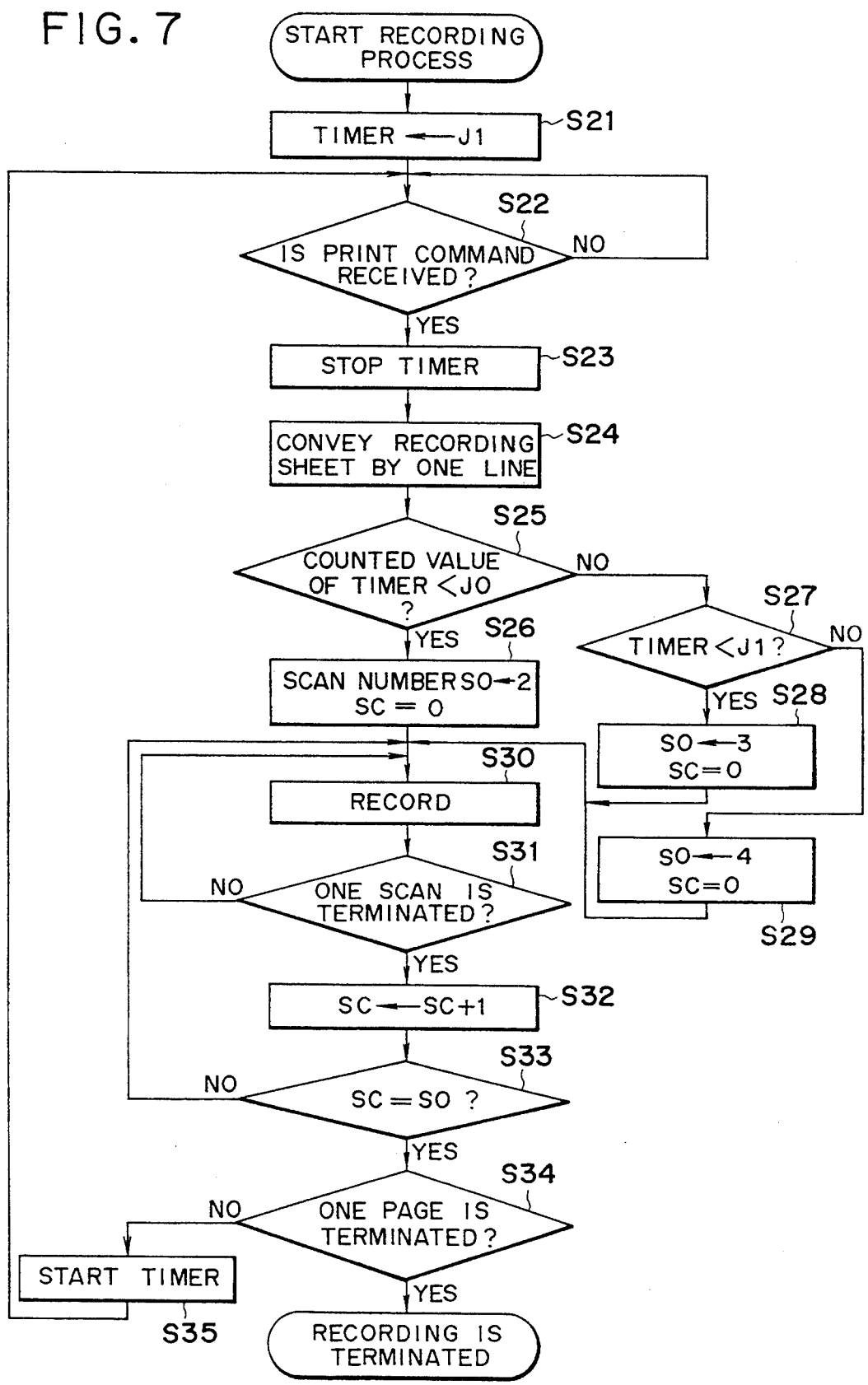
FIG. 7 is a flowchart showing an image recording process for one page in facsimile equipment of embodiment 2.

FIG. 7 is a flowchart showing recording operation control by the recording controller 6 in order to change the number of times of repeated recording (scan number) for each block in accordance with a recording cycle (recording time interval) in facsimile equipment of the present embodiment.

First, at step S21, an initial value J1 is set for the interval timer 63 for counting a recording time interval. The initial value J1 is intended for the first line of lines to be recorded on recording sheet for which the number of recordings for each block is set to the maximum value "4". Here, $J1 \cong 5$ ms and $J0 \cong 2$ ms are assumed. Next, at step S22, a judgement is made as to whether or not a print command has been received; when a print command is input from the main controller 1, step S23 proceeds to stop counting by the timer 63. At the beginning of a page, a counted value of the timer 63 is J1 (5 ms).

Next, step S24 proceeds to drive the recording controller 6 to start to convey the recording sheet; at step S25, a counted value of the timer 63 judges whether or not a time interval between the preceding start of conveying recording sheet and the current start of conveying recording sheet is smaller than J0 (2 ms). If the counted value of the timer 63 is 2 ms or less, step S26 proceeds to set a scan number flag S0 to "2". If the counted value of the timer 63 exceeds 2 ms, step S27 proceeds to judge whether or not the counted value of the timer 63 is smaller than J1 (5 ms). If the counted value of the timer 63 is 5 ms or less, step S28 proceeds to set "3" for the scan number flag S0; if the counted value of the timer 63 is 5 ms or more, step S29 proceeds to set "4" for the scan number flag S0. In such fashion, if a value T of the interval timer 63 indicating a recording interval meets an inequality of $0 \leq T < 2$ ms, recording is conducted two times; if the value T meets an inequality of $2 \text{ ms} \leq T < 5$ ms, a recording operation is conducted three times; and if the value T meets an inequality of $5 \text{ ms} \leq T$, a recording operation is conducted four times, wherein a maximum energy is applied, thereby recording an image. At steps S26, S28 and S29, scan counter Sc=0 is also established.

Next, step S30 proceeds to conduct an actual recording operation, for example, as shown in a timing chart of FIG. 6. The recording process indicates a process that heating elements of the thermal head 8 are divided, for example, to four blocks, and each block is energized once for recording for one scan (for one recording operation). Energizing time (pulse width) for each of the blocks is determined on the basis of a temperature of the thermal head 8 detected by the thermistor 9. For example, a pulse width is made relatively narrow at high temperatures, and a pulse width is made relatively wide at low temperatures. When each block of the thermal head 8 is energized once for recording for one scan at step S31, step S32 proceeds to increment the scan counter Sc (+1). The scan flag S0 and the scan number counter Sc are provided in RAM of the recording controller 6.

Next, at step S33, a comparison is made between a scan number S0 which has been preset at aforementioned step S26, S28 or S29 and a value of the counter Sc. If Sc≠S0 (recording has not been made a specified number of times), the process returns to step S30 to repeat the aforementioned recording operation. If Sc=S0 is established at step S33, recording for one line is judged to be terminated, and step S34 made to judge whether or not recording for one page is terminated. If recording for one page is terminated, the recording process is terminated; if recording for one page is not terminated, step S35 proceeds to start counting a recording time interval between the termination of recording for a current line and the start of recording for a next line. Next, proceeding to step S22 is made to wait for a next print start command to be input from the main controller 1; when a print start command is input, the timer 63 is stopped at step S23. Thus, a time interval to the start of next recording is counted by the timer 63, and the number of times of repeated recording at recording for a next line is determined.

In the timing chart of FIG. 6, a print start command for a first line is received at T1, and a recording operation is conducted four times for each block for recording, thus terminating recording for one line. According to a control flowchart shown in FIG. 7, a time interval J10 extending until a print command for a next line is received conforms to an inequality of 2 ms≦J10<5 ms, and therefore, a recording operation to be started at T2 is repeated three times for recording.

Furthermore, a time interval J20 between a recording line 2 to be started at timing T2 and a recording line 3 to be started at timing T3 and a time interval J30 between a recording line 3 and a recording line 4 are both smaller than 2 ms, and therefore, print commands to be started at timing T3 and timing T4 cause a recording operation to be repeated twice for recording.

The timing of receiving a print start command at timing T5 is such that a time interval J40 between a fourth line and a fifth line is 50 ms or more, and therefore, recording is repeated four times for recording the fifth line.

In the embodiment described above, the maximum number of times of recording at recording one line is four; however, the present invention is not limited to four in the maximum number of times of recording at recording one line, but allows as many times of recording as desired.

The present invention may be applied to a system comprising a plurality of apparatuses or equipment comprising a single apparatus. The present invention can be embodied only by supplying systems or equipment with a program for executing process specified therein without involving a major change in equipment mechanisms.

As described above, the present invention makes it possible to relax the effects of heat accumulation in, and heat radiation from, a recording head caused by a change in a recording time interval for each line and hence, reduce an unevenness in density of a recorded image. Also, when a recording time interval is short, the time required for recording for one line can be reduced by reducing the number of times of repeated recording, thereby making divided recording of a good efficiency possible. The prevent invention also makes it possible to prolong the service life of a recording head and reduce the sticking of ink sheet with recording sheet at thermal ink transfer, the dragging of a recorded image and the like, thereby making recording at even density and high recording quality possible.

Typical examples of a recording system used by a recording apparatus according to the present invention are a thermal system and a thermal ink transfer system.

Figure 8:
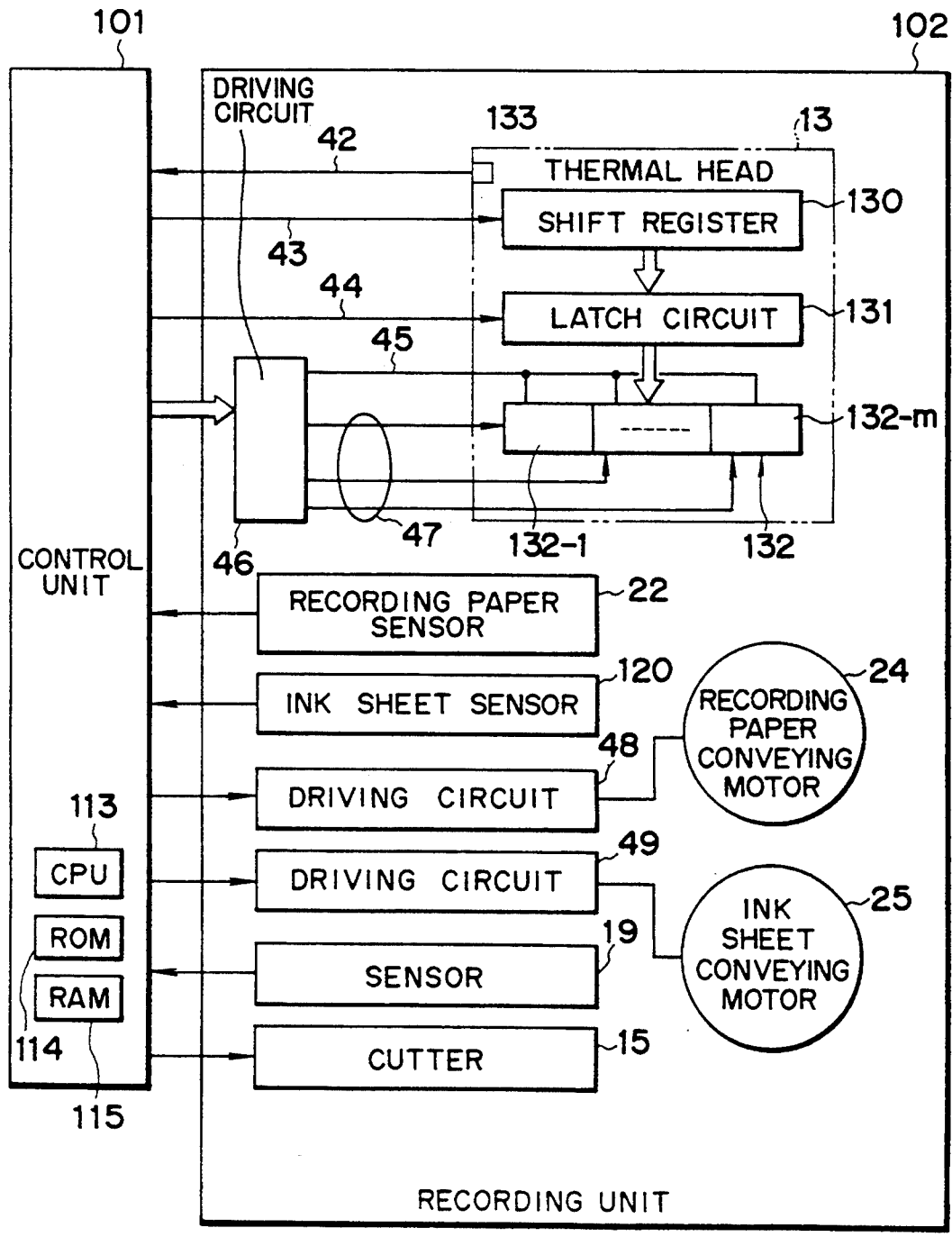
FIG. 8 is a diagram showing electrical connections between a control unit and a recording unit in facsimile equipment using a thermal head as a recording head.

FIG. 8 shows electrical connections between a control unit 101 and a recording unit 102 in facsimile equipment using a thermal head as a recording head.

A thermal head 13 is a line head. The thermal head 13 has a shift register for inputting serial recording data 43 for one line from the control unit 101, a latch circuit 131 for latching the data in the shift register 130 in response to a latch signal 44, and a heating element 132 comprising heating resistors for one line. The heating resistor 132 is divided into m blocks indicated by reference numerals 132-1 to 132-m for driving. The reference numeral 133 is a temperature sensor 133 mounted on the thermal head 13 for detecting a temperature of the thermal head 13. An output signal 42 from the temperature sensor 133 is A/D converted in the control unit 101 and input to a CPU 113. The CPU 113 detects a temperature of the thermal head 13 from the output signal, and changes a pulse width of strobe signals 47 in correspondence with the temperature or changes a driving voltage or the like for the thermal head 1, thereby changing an applied energy for the thermal head 13 in accordance with a characteristics of ink sheet.

The characteristics (kind) of ink sheet is indicated by a switch, not shown. The characteristic, kind of ink sheet may be identified by detecting a mark printed on ink sheet or by identifying a mark on, a notch in, or a projection from a cartridge, cassette or the like for the ink sheet.

The reference numeral 46 designates a driving circuit which receives a driving signal input from the thermal head 13 and outputs strobe signals 47 for driving the thermal head 13 in block units. The driving circuit 46 can change, under an instruction from the control unit 101, a voltage to be output to a power line 45 through which current is supplied to the heating element 132 of the thermal head 13, thereby changing an applied energy for the thermal head 13. Reference numerals 48 and 49 designate motor driving circuits for driving a recording paper conveying motor 24 and an ink sheet conveying motor 25, respectively. Stepping motors are preferably used as the recording paper conveying motor 24 and the ink sheet conveying motor 25. However, the type of the recording paper conveying motor 24 and the ink sheet conveying motor 25 is not limited to stepping motors; for example, DC motors may be used as such motors.

Another example of a recording system used by a recording apparatus according to the present invention is an ink jet recording system.

A recording head portion to be applied to an ink jet recording apparatus usually has fine liquid dischage ports (orifices), liquid paths and energy acting portions provided in partial portions thereof, and energy generating means for generating droplet forming energy to be acted on said acting portions.

Energy generating means for generating such energy include means using an electromechanical conversion body such as a piezoelectric element, means of irradiating liquid with electromagnetic waves of laser or the like for causing the liquid to absorb the electromagnetic waves and thereby, heating the liquid for discharging and flying droplets by said heating action, and means using an electrothermal conversion body for heating liquid and thereby, discharging the liquid. In particular, a recording head portion to be used in an ink jet recording system in which liquid is discharged by thermal energy allows a highly dense array of liquid discharge ports (orifices) for discharging liquid droplets and forming flying liquid droplets for recording use, and consequently, is capable of making high-resolution recording.

For the typical construction and principle of a recording head portion using an electrothermal conversion body as energy generating means, it is preferable to use, for example, a basic principle disclosed in U.S. Pat. No. 4,723,129 Specification or U.S. Pat. No. 4,740,796

Specification. The system is applicable to either so-called on-demand type or continuous type. In particular, in the case of on-demand type, at least one driving signal causing a sharp temperature rise which corresponds to recording information and exceeds nucleate boiling is applied to an electrothermal conversion body arranged in correspondence with liquid (ink) holding sheet and liquid paths, thereby causing thermal energy to be generated in the electrothermal body and causing film boiling to occur on the heat acting surface of a recording head with a resultant formation of a bubble in liquid (ink) making one-to-one correspondence with the driving signal. The growth and contraction of a bubble causes liquid (ink) to be discharged through an opening for discharge, thereby forming at least one droplet. If the driving signal is in pulse form, the growth and contraction of a bubble is conducted quickly and appropriately, thereby achieving liquid (ink) discharge excellent especially in response performance; therefore, the driving signal in pulse form is more preferable.

In addition, a recording head portion using an electrothermal conversion body as energy generating means is easy to make an entire recording head portion compact, and is also easy to implement multinozzle and high density mounting because of easy implementation of a long size, a plane-like form (two-dimensional form) and the like through the sufficient utilization of the advantages of IC technology and microprocessing technology recently showing noticeable technological advancement and improvement of reliability in a semiconductor area, and furthermore, makes it possible to supply head portions for ink jet recording at good mass productivity and low manufacturing cost.

As described above, a recording head portion for ink jet manufactured through semiconductor manufacturing processes with an electrothermal conversion body used as energy generating means is usually constructed such that a liquid path is provided in correspondence with each ink discharge port, and is provided with an electrothermal conversion body as means for causing thermal energy to act on liquid with which the liquid path is filled, thereby discharging liquid from a corresponding ink discharge port for forming a flying droplet, and each liquid path is fed with liquid from a common liquid chamber connected to each liquid path. A patent is applied for such a manufacturing method for an ink discharge portion that after a solid layer for forming at least liquid paths, an activation energy ray setting material layer to be utilized for forming at least walls of liquid paths, and a second substrate are laid on a first substrate one over the other in the order, a mask is laid over the second substrate, activation energy rays are irradiated from above the mask for hardening at least the portions of liquid path walls of the activation energy ray setting material layer as composing portions, and moreover, the solid layer and unhardened portions of the activation energy ray setting material layer are removed from between the two substrates for forming at least liquid paths (refer to Japanese Patent Application Laid-Open Application No. 62-253457).

Figure 9:
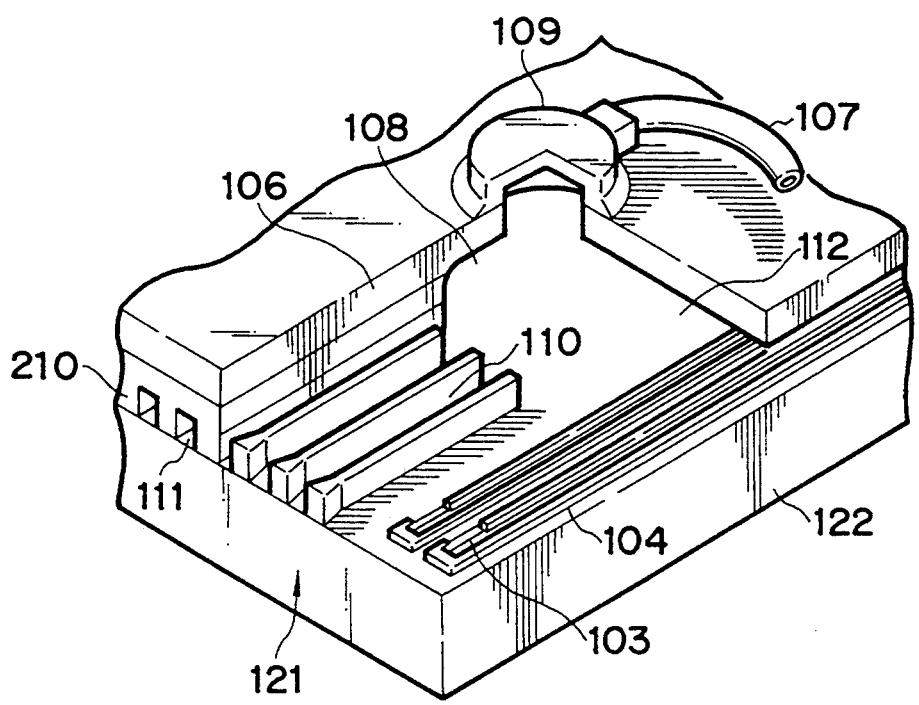
FIG. 9 is a view showing a schematic construction of an ink jet recording head unit.

FIG. 9 designates a schematic construction of an ink jet recording head portion described above. A recording head portion 121 comprises a hardened activation energy ray setting material layer 210 having electrothermal conversion bodies 103, electrodes 104, and liquid paths 110 which are film formed on a substrate 122, i.e., the first substrate, and a top plate 106 after undergoing semiconductor manufacturing processes such as etching deposition, sputtering, etc. In such recording head portion 121, recording liquid 112 is fed to a common liquid chamber through a liquid feed pipe 107 from a liquid storage chamber, not shown.

The reference numeral 109 designates a connector for the liquid feed pipe. The recording liquid 112 fed to the common liquid chamber 108 is fed to the liquid paths 110 by capillarity and held stably therein because of meniscuses formed in the ink discharge ports 111 at liquid path ends. When the electrothermal conversion bodies 103 are energized, liquid on electrothermal conversion surfaces is heated, film boiling causes bubbling phenomenon to occur, and consequently, the growth of bubbles causes droplets to be discharged from the ink discharge ports 111. By using the construction described above, a multinozzle ink jet recording head portion can be formed with liquid path piping of a discharge port density as high as 400 dots/inch.

What is claimed is:

1. A recording apparatus using a recording head for recording in line units, said apparatus comprising:
    a first recording mode in which said recording head is driven once to record one line in accordance with recording data;
    a second recording mode in which said recording head is driven plural times to record one line in accordance with said same recording data; and
    control means for gradually reducing driving energy for each drive of said plural times driving with said same recording data in said second recording mode.

2. A recording apparatus according to claim 1, further comprising counting means for counting a time interval between the termination of recording for one line and the start of recording for a next one line, wherein said control means controls said driving energy in accordance with said counting means.

3. A recording apparatus according to claim 2, wherein said recording head is driven upon application of a pulse and said control means changes a pulse width.

4. A recording apparatus according to claim 3, wherein said control means controls said pulse to be short when the time interval counted by said counting means is short.

5. A recording apparatus according to claim 1, wherein said recording head comprises an ink jet recording head having a thermal energy converting element for generating thermal energy to be applied to ink to discharge ink by using thermal energy.

6. A recording apparatus according to claim 5, wherein said recording head discharges ink from a discharging port by using film boiling caused by thermal energy applied from the thermal energy converting element.

7. A recording apparatus using a recording head for recording in line units, said apparatus comprising:
    reading means for reading an original image;
    a first recording mode in which said recording head is driven once to record one line in accordance with recording data;
    a second recording mode in which said recording head is driven plural times to record one line in accordance with said same recording data;
    control means for gradually reducing driving energy for each drive of said plural times driving with said same recording data in said second recording mode; and counting means for counting a time interval between the termination of recording for one line and the start of recording for a next one line, said control means controlling the driving energy in response to said counting means.

8. A recording apparatus using a recording head for recording in line units, said apparatus comprising:
transmitting/receiving means for transmitting/receiving image information;
a first recording mode in which said recording head is driven once to record one line in accordance with recording data;
a second recording mode in which said recording head is driven plural times to record one line in accordance with said same recording data;
control means for gradually reducing driving energy for each drive of said plural times driving with said same recording data in said second recording mode; and
counting means for counting a time interval between the termination of recording one line and the start of recording for a next one line, said control means controlling the driving energy in response to said counting means.

9. A recording apparatus according to claim 8, further comprising reading means for reading an original image.

10. A recording apparatus using a recording head for recording in line units, said apparatus comprising:
a first recording mode in which said recording head is driven once to record one line in accordance with recording data;
a second recording mode in which said recording head is driven plural times to record one line in accordance with said same recording data;
counting means for counting a time interval between the termination of recording for one line and the start of recording for a next one line; and
control means for reducing a number of times which said recording head is driven, based on said same recording data in accordance with said counting means.

11. A recording apparatus according to claim 10, wherein in said first recording mode, recording may be performed, on the basis of a plurality of data to a recording area, in accordance with the same data, in said second recording mode.

12. A recording apparatus according to claim 10, wherein said recording head comprises an ink jet recording head having a thermal energy converting element for generating thermal energy to be applied to ink to discharge ink by using thermal energy.

13. A recording apparatus according to claim 10, wherein said recording head discharges ink from a discharging port by using film boiling caused by thermal energy applied from the thermal energy converting element.

14. A recording apparatus using a recording head for recording in line units, said apparatus comprising:
reading means for reading an original image;
a first recording mode in which said recording head is driven once to record one line in accordance with recording data;
a second recording mode in which said recording head is driven plural times to record one line in accordance with said same recording data;
counting means for counting a time interval between the termination of recording for one line and the start of recording for a next one line; and
control means for reducing a number of times which said recording head is driven based on said same recording data in accordance with said counting means.

15. A recording apparatus using a recording head for recording in line units, said apparatus comprising:
transmitting/receiving means for transmitting/receiving image information;
a first recording mode in which said recording head is driven once to record one line in accordance with recording data;
a second recording mode in which said recording head is driven plural times to record one line in accordance with said same recording data;
counting means for counting a time interval between the termination of recording for one line and the start of recording for a next one line; and
control means for reducing a number of times which said recording head is driven, based on said same recording data, in accordance with said counting means.

16. A recording apparatus according to claim 15, further comprising reading means for reading an original image.

17. An apparatus according to claim 1, wherein said recording head is a thermal recording head having thermal energy generating means for generating thermal energy for recording in accordance with the driving.

18. An apparatus according to claim 10, further comprising control means for gradually reducing driving energy for each drive of said plural times driving with said same recording data is recorded in said second recording mode.

19. An apparatus according to claim 10, wherein said recording head is a thermal recording head having thermal energy generating means for generating thermal energy for recording in accordance with the driving.

20. A recording apparatus using a recording head having thermal energy generating means for generating thermal energy in accordance with application of a driving pulse, said apparatus recording on a recording medium upon driving of said thermal energy generating means, said apparatus comprising:
record control means for recording by driving said thermal energy generating means plural times in accordance with the same recording data; and
driving means for driving to gradually reduce thermal energy generated by said thermal energy generating means upon driving plural times said thermal energy generating means in accordance with said same recording data.

21. An apparatus according to claim 20, wherein said driving means drives said thermal energy generating means by controlling a width of a drive pulse for driving said thermal energy generating means.

22. An apparatus according to claim 21, further comprising counting means for counting a time interval between termination of a previous recording and commencement of a next recording and determining means for determining the pulse width of a first drive of the plural drives by said driving means in accordance with the time interval counted by said counting means.

23. An apparatus according to claim 22, wherein said determining means determines the degree of gradual reduction of thermal energy generated by said thermal energy generating means at the plural drives by said driving means in accordance with the time interval counted by said counting means.

24. An apparatus according to claim 20, wherein said recording head is an ink jet recording head having a thermal energy converting element for generating thermal energy to be applied to ink to discharge ink by using thermal energy.

25. An apparatus according to claim 24, wherein said recording head discharges ink from a discharging port by using film boiling caused by thermal energy applied from the thermal energy converting element.

26. A recording apparatus using a recording head having thermal energy generating means for generating thermal energy in accordance with application of a driving pulse, said apparatus recording on a recording medium upon driving of said thermal energy generating means, said apparatus comprising:

record control means for recording by driving said thermal energy generating means plural times in accordance with the same recording data;

counting means for counting a time interval from termination of a previous recording to commencement of a next recording; and control means for controlling the number of plural times said thermal energy generating means is driven in accordance with the same recording data, by said record control means, in accordance with the time interval counted by said counting means.

27. An apparatus according to claim 26, wherein said control means reduces the number of the drives as the time interval counted by said counting means becomes short.

28. An apparatus according to claim 26, wherein said recording head is an ink jet recording head having a thermal energy converting element for generating thermal energy to be applied to ink to discharge ink by using thermal energy.

29. An apparatus according to claim 28, wherein said recording head discharges ink from a discharging port by using film boiling caused by thermal energy applied from the thermal energy converting element.

30. A method using a recording head having thermal energy generating means for generating thermal energy in accordance with application of a driving pulse, the method recording on a recording medium upon driving of the thermal energy generating means, the method comprising the steps of:

recording by driving the thermal energy generating means plural times in accordance with the same recording data; and driving so as to gradually reduce thermal energy generated by the thermal energy generating means upon driving plural times the thermal energy generating means in accordance with the same recording data.

31. A method using a recording head having thermal energy generating means for generating thermal energy in accordance with application of a driving pulse, the method recording on a recording medium upon driving of the thermal energy generating means, the method comprising the steps of:

recording by driving said thermal energy generating means plural times in accordance with the same recording data;

counting a time interval from termination of a previous recording to commencement of a next recording; and controlling the number of the plural times the thermal energy generating means is driven with the same recording data in accordance with the time interval counted in the counting step.

32. A method according to claim 31, wherein in the controlling step the number of plural times the thermal energy generating means is driven is reduced as the time interval counted in the counting step decreases.

* * * * *

UNITED STATES PATENT AND TRADEMARK OFFICE
CERTIFICATE OF CORRECTION

PATENT NO. : 5,452,095

DATED : September 19, 1995

INVENTORS : Takeshi Ono et al.

It is certified that error appears in the above-identified patent and that said Letters Patent is hereby corrected as shown below:

ON THE TITLE PAGE:

AT [56] REFERENCES CITED

Foreign Patent Documents,
"62-253457 11/1962 Japan" should read --62-253457 11/1987 Japan--.

AT [76] INVENTORS

"[76] Inventors: Takeshi Ono; Masakatsu Yamada, both of c/o Canon Kabushiki Kaisha 30-2, 3-chome, Shimomaruko, Ohta-ku, Tokyo, Japan" should read --[75] Inventors: Takeshi Ono; Masakatsu Yamada, both of Tokyo, Japan--.

COLUMN 1

Line 41, "the" (first occurrence) should be deleted and "mode," should read --mode--.

COLUMN 2

Line 9, "paper" should read --papers--.

UNITED STATES PATENT AND TRADEMARK OFFICE
CERTIFICATE OF CORRECTION

PATENT NO. : 5,452,095

DATED : September 19, 1995

INVENTORS : Takeshi Ono et al.

It is certified that error appears in the above-identified patent and that said Letters Patent is hereby corrected as shown below:

COLUMN 3

Line 42, "incorporating facsimile equipment of" should read --of facsimile equipment incorporating--.

Line 46, "with" should read --having-- and "having" should read --with--.

COLUMN 4

Line 4, "motor" should read --motor 7--.

COLUMN 5

Line 44, "proceeding to" should be deleted.

COLUMN 6

Line 5, "a" (second occurrence) should be deleted.

UNITED STATES PATENT AND TRADEMARK OFFICE
CERTIFICATE OF CORRECTION

PATENT NO. : 5,452,095

DATED : September 19, 1995

INVENTORS : Takeshi Ono et al.

It is certified that error appears in the above-identified patent and that said Letters Patent is hereby corrected as shown below:

COLUMN 9

Line 41, "process" should read --processes--.

Signed and Sealed this

Second Day of April, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,452,095
DATED : September 19, 1995
INVENTOR(S) : Takeshi Ono et al.

It is certified that error appears in the above-indentified patent and that said Letters Patent is hereby corrected as shown below:

Title page, insert item [73]  Assignee:  Canon Kabushiki Kaisha, Tokyo, Japan

Signed and Sealed this

Twenty-eighth Day of October, 1997

Attest:

BRUCE LEHMAN

Attesting Officer             Commissioner of Patents and Trademarks